United States Patent Office 3,134,675
Patented May 26, 1964

3,134,675
LIGHT-SENSITIVE, AMINOPYRIDINEDIAZONIUM SALT COMPOSITIONS
Ralph G. D. Moore, Chenango Forks, and Robert J. Cox, Chenango Bridge, N.Y., assignors to General Aniline & Film Corporation, New York, N.Y., a corporation of Delaware
No Drawing. Original application Sept. 30, 1958, Ser. No. 764,242, now Patent No. 3,082,200, dated Mar. 19, 1963. Divided and this application May 9, 1962, Ser. No. 193,602.
16 Claims. (Cl. 96—91)

The present invention relates to aminopyridinediazonium salts and, more particularly, to the use of said salts in the diazotype process.

The diazotype process, as is known, involves sensitization of a base such as paper or the like with a light-sensitive diazo compound, exposing the sensitized material under a pattern to burn out the diazo where the light strikes and developing an image by coupling the undecomposed diazo with an azo dye coupling component in the presence of a base such as ammonia, sodium hydroxide or the like. The speed and overall utility of the process depend upon the rapidity and degree that the diazonium compound is burned out on exposure, the rapidity with which the diazo couples to form azo dye and the density of dye image obtained.

Many diazonium compounds have been recommended for use in manufacturing diazotype materials. For the most part, these diazos are derived from p-phenylenediamines. While these compounds produce satisfactory materials for the diazotype process, they still leave much to be desired from the standpoint of the speed of the material, the density of the images and the rate of development.

We have now found that diazonium compounds which meet the prerequisites of the diazotype art to a very high degree are aminopyridinediazonium salts in which the amino group is secondary or tertiary. Such diazonium compounds and their use in light-sensitive diazotype materials constitute the purposes and objects of the present invention.

The diazonium salts contemplated herein may be typified by the following structural formulae:

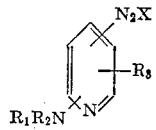

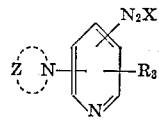

and

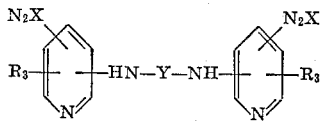

in which $R_1$ is hydrogen, alkyl such as methyl, ethyl, propyl, butyl or the like, aryl of the benzene series such as phenyl, tolyl, diethylaminophenyl, dimethylaminophenyl or the like, pyridyl or aralkyl, such as benzyl and $R_2$ may be alkyl as above, aryl as above, pyridyl, or aralkyl as above; Z represents the atoms necessary to complete a 6-membered hydrogenated heterocyclic ring system; $R_3$ is hydrogen or alkyl as above; X is an anion such as halide, sulfate, nitrate or the like; and Y is diphenyl or benzylphenyl.

Examples of the compounds within the above formulae which we have found to be eminently suitable are:

6 - dimethylamino - 3 - pyridinediazonium chloride and its zinc chloride, stannic chloride, cadmium chloride, mercuric chloride, boron trifluoride double salts
6 - diethylamino - 3 - pyridinediazonium chloride and its its aforementioned double salts
6 - methylamino - 3 - pyridinediazonium chloride and its aforementioned double salts
6 - ethylamino - 3 - pyridinediazonium chloride and its aforementioned double salts
6-morpholino-3-pyridinediazonium chloride
6-piperazino-3-pyridinediazonium chloride
6-benzylamino-3-pyridinediazonium chloride
6-p-toluidino-3-pyridinediazonium chloride
6 - (p - dimethylaminoanilino) - 3 - pyridinediazonium chloride
N,N' - (4,4' - biphenylene)bis(6 - amino - 3 - pyridinediazonium chloride)
6-anilino-3-pyridinediazonium chloride
6-(2-pyridylamino)-3-pyridinediazonium chloride
6,6' - (p,p' - methylenedianilino)bis(3 - pyridinediazonium chloride)
N-methyl - 6 - anilino - 3 - pyridinediazonium chloride
6 - dimethylamino - 5 - methyl - 3 - pyridinediazonium chloride
2-dimethylamino-3-pyridinediazonium chloride The couplers with which the diazonium salts were used are those normally employed in diazotype materials. Below is a listing of couplers which can be used with our diazonium compounds and the color produced therewith:

| Coupler: | Dye Color |
|---|---|
| Resorcinol | Sepia. |
| 6,7 - dihydroxy - 2 - naphthalenesulfonic acid | Reddish purple. |
| 2,3 - naphthalenediol | Reddish purple. |
| Acetoacetanilide | Yellow. |
| Phloroglucinol | Reddish brown. |
| m-hydroxyphenylurea | Sepia. |
| N-benzylacetoacetamide | Yellow. |
| 3-methyl - 1-phenyl-5-pyrazolone | Orange. |
| N - o - methoxyphenyl - 3 - hydroxy-2-naphthamide | Blue-purple. |
| 4,4'-thiodiresorcinol | Red to sepia. |

In preparing our novel compounds, we have found it to be generally more convenient to form the double salt of the compound and an inorganic salt such as, for example, zinc chloride, stannic chloride, cadmium chloride, mercuric chloride, boron trifluoride, and many others and to isolate our novel compounds in the form of such double salts.

Below we have given a number of examples of our novel compounds and processes for their preparation. It is to be understood, however, that these examples are given by way of illustration only and not by way of limitation.

EXAMPLE I

*6-Dimethylamino-3-Pyridinediazonium Chloride*

A solution of 1.7 g. of 5 - amino - 2 - dimethylaminopyridine hydrochloride in 10 ml. of hydrochloric acid (sp. gr. 1.19) was cooled with stirring to 0° C. and treated dropwise with 5 M sodium nitrate at 0–5° C. until an excess of nitrite remained in the solution. About 2 g. of solid stannic chloride pentahydrate were added, whereupon a yellow solid precipitated which was filtered and dried. It melted at 165° C. with decomposition and was probably a complex salt of the diazo with the following structure:

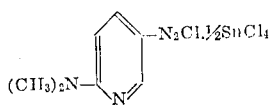

5 - amino - 2 - dimethylaminopyridine hydrochloride was isolated in 78% yield by the reduction of 2.19 g. of 2-dimethylamino - 5 - nitropyridine in 50 ml. of isopropyl alcohol under 3–4 atmospheres of hydrogen over palladium on carbon catalyst. The catalyst was filtered off and anhydrous hydrogen chloride was passed into the solution to precipitate the amine hydrochloride which was recrystallized from an isopropyl alcohol-water mixture. It melted at 260° C. with decomposition.

2 - dimethylamino - 5 - nitropyridine, M. 154–5° C., was obtained by nitration of 2 - dimethylaminopyridine, B. 81–85° C./15 mm., which was prepared by methylation of 2-aminopyridine with dimethyl sulfate and sodamide (Ber. 61, 429).

EXAMPLE II

*6-Methylamino-3-Pyridinediazonium Chloride*

A solution of 7.6 g. of 5-amino-2-methylaminopyridine hydrochloride in 20 ml. of hydrochloric acid (sp. gr. 1.19) cooled to between 0–5° C. with stirring was treated dropwise with 7.8 ml. of 5 M sodium nitrate solution, the temperature being held at 5° C. or lower. 5 g. of stannic chloride pentahydrate were added to the solution and the resultant slurry of dark solid was stirred for 15 minutes. The precipitate was filtered, washed with a brine solution, and dried. It weighed 10.2 g., melted at 154° C. with decomposition, and probably had the structure:

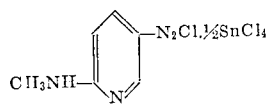

5 - amino - 2 - methylaminopyridine hydrochloride was prepared by the reduction of 8.9 g. of 2-methylamino-5-nitropyridine in 200 ml. of ethanol under 3–4 atmospheres pressure of hydrogen over palladium on carbon catalyst. The catalyst was filtered off and anhydrous hydrogen chloride was passed into the filtrate until a dark precipitate appeared. The precipitate was filtered and washed, first with ethanol, then with ether. It weighed 7.6 g., which corresponds to a yield of 67%, and melted at 239–41° C. with decomposition.

2-methylamino-5-nitropyridine, M. 180–1° C., was prepared in 92% yield by the action of methylamine on 2-chloro - 5 - nitropyridine, M. 106–8° C., which in turn was prepared from 2-aminopyridine by nitration, diazotization, hydrolysis and finally reaction with phosphorus pentachloride (J. Chem. Soc. (1941, 12).

EXAMPLE III

*6-Morpholino-3-Pyridinediazonium Chloride*

A slurry of 10 g. of 5-amino - 2 - morpholinopyridine hydrochloride in 10 ml. of hydrochloric acid (sp. gr. 1.19) and 15 ml. of water was cooled to 0° C. with stirring. 11.6 ml. of 5 M sodium nitrite were added dropwise, not allowing the temperature to rise above 5° C. 3 g. of stannic chloride pentahydrate were added to the yellow solution and a yellow brown solid precipitated. Stirring was continued for one-half hour and after standing in the cold overnight, the precipitate was filtered, washed with a brine solution and dried. It weighed 4.7 g., melted at 162° C. with decomposition, and probably had the structure:

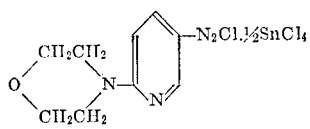

5 - amino - 2 - morpholinopyridine hydrochloride was prepared in 90% yield by hydrogenating 2 - morpholine-5-nitropyridine in ethanol at 3–4 atmospheres pressure over palladium on carbon catalyst. The catalyst was filtered off and anhydrous hydrogen chloride was passed into the filtrate until a white solid precipitated which melted at about 250° C. with decomposition.

2 - morpholino - 5 - nitropyridine, M. 142–3° C., was prepared in 75% yield by reaction of morpholine with 2-chloro - 5 - nitropyridine prepared as outlined in Example II.

EXAMPLE IV

*6-Piperazino-3-Pyridinediazonium Chloride*

A solution of 3.1 g. of 5 - amino - 2 - piperazinopyridine hydrochloride in 5 ml. of hydrochloric acid (sp. gr. 1.19) and 5 ml. of water was cooled to 0° C. with stirring and treated with 2 g. of stannic chloride pentahydrate. Then 2.2 ml. of 5 M sodium nitrite were added dropwise, the temperature not being allowed to rise above 5° C. Stirring was continued for 15 minutes and the yellow product was collected by filtration, washed with water, and dried. It weighed 1.5 g., melted at 160° C. with decomposition, and probably had the structure:

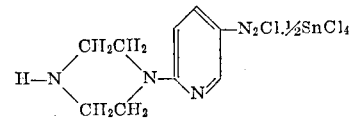

5 - amino - 2 - piperazinopyridine hydrochloride was made in 76% yield by the reduction of 3.3 g. of 2-piperazino - 5 - nitropyridine in ethanol at 3–4 atmospheres pressure of hydrogen over palladium on carbon catalyst. The catalyst was filtered off and a white solid was precipitated by passing anhydrous hydrogen chloride through the filtrate. It melted over the range 240–45° C. with decomposition.

2 - piperazino - 5 - nitropyridine, M. 84–5° C., was prepared in 24% yield by reaction of piperazine with 2-chloro-5-nitropyridine obtained as in Example II.

EXAMPLE V

*6-Benzylamino-3-Pyridinediazonium Chloride*

A solution of 6.5 g. of 5 - amino - 2 - benzylaminopyridine hydrochloride in 2.2 ml. of hydrochloric acid (sp. gr. 1.19) and 100 ml. of water was cooled to 0° C. with stirring and was treated with 6 ml. of 5 M sodium nitrite. The solution was allowed to stir for one-half hour and then 10.5 g. of stannic chloride pentahydrate were added and the yellow solid that precipitated was collected by filtration and dried. It weighed 6.4 g., melted at 155° C. with decomposition, and probably had the structure:

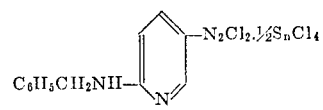

5 - amino - 2 - benzylaminopyridine hydrochloride was prepared in 89% yield by the reduction of 7.4 g. of 2-benzylamino - 5 - nitropyridine in 250 ml. of isopropyl alcohol at 3–4 atmospheres of hydrogen pressure over palladium on carbon catalyst. The catalyst was filtered off and anhydrous hydrogen chloride was passed into the filtrate. A white solid was precipitated by the addition of about one liter of ether. It melted over the range 210–20° C. with decomposition.

2 - benzylamino - 5 - nitropyridine, M. 131–4° C., was prepared in 51% yield by the condensation of benzylamine with 2-chloro-5-nitropyridine prepared as in Example II.

EXAMPLE VI

*6-p-Toluidino-3-Pyridinediazonium Chloride*

A solution of 8.3 g. of 5-amino-2-p-toluidinopyridine hydrochloride in 25 ml. of hydrochloric acid (sp. gr. 1.19)

and 75 ml. of water was cooled to 0° C. with stirring. 7 ml. of 5 M sodium nitrite was added dropwise, the temperature not being allowed to rise above 3° C. To this solution were added 30 ml. of 60% zinc chloride solution and the stirring was continued for one-half hour. The yellow solid which precipitated was filtered and dried. It weighed 10.8 g., melted at 137° C. with decomposition, and probably had the structure:

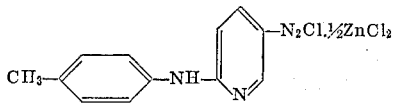

5-amino-2-p-toluidinopyridine hydrochloride was prepared in 82% yield by reduction of 2-p-toluidino-5-nitropyridine in ethanol at 3–4 atmospheres pressure of hydrogen over palladium on carbon catalyst. The catalyst was filtered off and anhydrous hydrogen chloride was passed into the filtrate until a white solid precipitated. It melted over the range 237–42° C. with decomposition.

2-p-toluidino-5-nitropyridine, M. 136–70° C., was prepared in 68% yield by condensation of p-toluidine with 2-chloro-5-nitropyridine (Example II).

EXAMPLE VII

*6-(p-Dimethylaminoanilino)-3-Pyridinediazonium Chloride*

A solution of 8.5 g. of 5-amino-2-(p-dimethylaminoanilino)-pyridine hydrochloride in 15 ml. of hydrochloric acid (sp. gr. 1.19) and 35 ml. of water was treated slowly with 6.5 ml. of 5 M sodium nitrite. To this solution were added 20 ml. of 60% zinc chloride solution and stirring was continued for one-half hour. The yellow product was filtered and dried. It weighed 9.0 g., melted at 128° C. with decomposition, and probably had the structure:

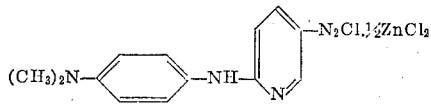

5 - amino - 2 - (p - dimethylaminoanilino)pyridine hydrochloride was prepared by the reduction of 2-(p-dimethylaminoanilino)-5-nitropyridine in ethanol at 3–4 atmospheres pressure of hydrogen over palladium on carbon catalyst. The catalyst was filtered off and anhydrous hydrogen chloride was passed into the solution until a white solid precipitated. The yield of hydrochloride was 90% of theory and it melted at 245° C. with decomposition.

2-(p-dimethylaminoanilino)-5-nitropyridine, M. 187–9° C., was prepared in 54% yield by the action of p-dimethylaminoaniline on 2-chloro-5-nitropyridine which was prepared as outlined in Example II.

EXAMPLE VIII

*N,N'-(4,4'-Biphenylene)bis(6-Amino-3-Pyridinediazonium Chloride*

2 g. of N,N'-bis(5-nitro-2-pyridyl)benzidine were slurried with 12.5 ml. of hydrochloric acid (sp. gr. 1.19) and 12.5 ml. of water. Zinc powder was added portionwise with continued stirring until a very pale yellow solution was obtained. The excess zinc was filtered off and ice was added to the filtrate until the temperature had dropped to 5° C. This solution was treated dropwise with 5 M sodium nitrite until it showed free nitrite ion. The orange yellow precipitate was filtered and dried. It weighed 0.5 g., melted at 106° C. with decomposition, and probably had the structure:

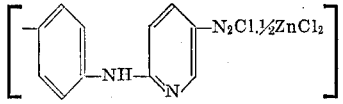

Crude N,N'-bis(5-nitro-2-pyridyl)benzidine, which did not melt at 320° C., was prepared in almost quantitative yield by the condensation of benzidine with 2-chloro-5-nitropyridine prepared as in Example II.

EXAMPLE IX

*6-Anilino-3-Pyridinediazonium Chloride*

A solution of 9.1 g. of 5-amino-2-anilinopyridine hydrochloride in 25 ml. of hydrocloric acid (sp. gr. 1.19) and 55 ml. of water was cooled with stirring to 0° C. This solution was treated with 20 ml. of a 60% solution of zinc chloride and then slowly with 7.9 g. of 5 M sodium nitrite solution. The reaction mixture was stirred for one-half hour and then allowed to stand in the cold overnight. The yellow precipitate was filtered, washed with a little water, and dried. It weighed 9.9 g., melted with decomposition at 128° C., and probably had the structure:

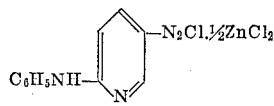

5-amino-2-analinopyridine hydrochloride was prepared in 76% yield by the hydrogenation of 2-anilino-5-nitropyridine in ethanol at 3–4 atmospheres pressure over palladium on carbon catalyst. The catalyst was filtered off and anhydrous hydrogen chloride was passed into the filtrate until a white solid precipitated, which was filtered, washed with ether, and dried. It melted with decomposition over the range 219–23° C.

2-anilino-5-nitropyridine, M. 134–7° C. (Ann. 518, 274–89 (1935)), was prepared in 54% yield by the action of aniline on 2-chloro-5-nitro-pyridine (Example II).

EXAMPLE X

*6-(2-Pyridylamino)-3-Pyridinediazonium Chloride*

A slurry of 1.5 g. of 5-amino-2-(2-pyridylamino)-pyridine hydrochloride with 5 ml. of hydrochloric acid (sp. gr. 1.19) and 15 ml. of water was cooled in an ice bath. 1.3 ml. of 5 M sodium nitrite were slowly added with stirring and the resultant yellow solution was treated with a few milliliters of 60% zinc chloride solution. The yellow precipitate was filtered, washed with a little water, and dried. It weighed 2.1 g., melted at 185° C. with decomposition, and probably had the structure:

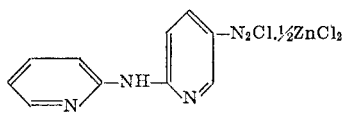

5-amino-2-(2-pyridylamino)pyridine hydrochloride was prepared in 98% yield by the reduction of 2-(2-pyridylamino)-5-nitropyridine in isopropyl alcohol under 3–4 atmospheres pressure of hydrogen over palladium on carbon catalyst. The catalyst was filtered off and a few drops of hydrochloric acid (sp. gr. 1.19) were added to the filtrate. The white solid which precipitated was collected.

2-(2-pyridylamino)-5-nitropyridine was prepared according to Chichibabin and Preobrazhenskii (Ber. 61, 203 (1928)) by the action of 2-aminopyridine on 2-chloro-5-nitropyridine (Example II).

EXAMPLE XI

*6,6'(p,p'-Methylenedianilino)bis(3-Pyridinediazonium Chloride)*

A solution of 1.7 g. of 5,5'-diamino-2,2'-(p,p'-methylenedianilino)dipyridine hydrochloride in 7.5 ml. of hydrochloric acid (sp. gr. 1.19) and 7.5 ml. of water was cooled to 0° C. with stirring. About 0.5 g. of zinc chloride was added to this solution and it was filtered. The filtrate was treated with 1 ml. of 5 M sodium nitrite solution and allowed to stand in the cold for one-half hour. The yellow precipitate was filtered and dried. It probably had the structure:

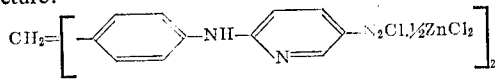

5,5′ - diamino-2,2′-(p,p′-methylenedianilino)dipyridine hydrochloride was prepared by the reduction of 3.4 g. of 5,5′ - dinitro - 2,2′-(p,p′-methylenedianilino)dipyridine in 200 ml. of ethanol and 50 ml. of acetone under 3–4 atmospheres pressure of hydrogen over palladium on carbon catalyst. The catalyst was filtered off and the filtrate was treated with a few drops of hydrochloric acid (sp. gr. 1.19). 1.7 g. of a solid which darkened at 200° C. and melted at 235° C. with decomposition were isolated.

5,5′ - dinitro - 2,2′-(p,p′-methylenedianilino)dipyridine, M. 203–7° C., was obtained by the condensation of p,p′-methylenedianiline with 2-chloro-5-nitropyridine (Example II).

EXAMPLE XII

N-Methyl-6-Anilino-3-Pyridinediazonium Chloride

A solution of 2.3 g. of N-methyl-2-anilino-5-nitropyridine in 200 ml. of isopropyl alcohol was reduced under 3–4 atmospheres pressure of hydrogen over palladium on carbon catalyst. The catalyst was filtered off and the filtrate was treated with a few drops of hydrochloric acid (sp. gr. 1.19) and then drowned in an excess of ether. The white precipitate was very hygroscopic and could not be easily handled in air. It was, therefore, dissolved in 5 ml. of hydrochloric acid (sp. gr. 1.19) and 5 ml. of water, cooled to 0° C. with stirring, and treated slowly with 2 ml. of 5 M sodium nitrite solution. The addition of a few ml. of concentrated stannic chloride solution precipitated a yellow solid which after trituration with ether was filtered and dried. It weighed 3.0 g., melted with decomposition over the range 145–7° C., and probably had the structure:

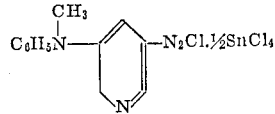

N-methyl-2-anilino-5-nitropyridine, M. 102–4° C., was prepared by condensation of N-methylaniline with 2-chloro-5-nitropyridine (Example II).

EXAMPLE XIII

6-Dimethylamino-5-Methyl-3-Pyridinediazonium Chloride

A solution of 3.0 g. of 5-amino-2-dimethylamino-3-methylpyridine hydrochloride in 2.5 ml. of hydrochloric acid (sp. gr. 1.19) and 2.5 ml. of water was cooled with stirring to 0° C. and treated with 3.2 ml. of 5 M sodium nitrite below 5° C. About 2 ml. of a concentrated stannic chloride solution were added and the mixture was stirred for about one-half hour. The yellow precipitate was filtered, washed with a little water, and dried. It weighed 4.0 g., melted with decomposition over the range 135–7° C., and probably had the structure:

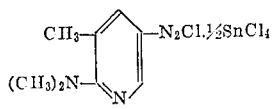

5-amino-2-dimethylamino-3-methylpyridine hydrochloride was prepared by reduction of 17.3 g. of 2-dimethylamino-3-methyl-5-nitropyridine in 250 ml. of ethanol under 3–4 atmospheres of hydrogen pressure over palladium on carbon catalyst. The catalyst was filtered off and the filtrate was treated with a few drops of hydrochloric acid (sp. gr. 1.19) and then was poured into about 10 times the volume of ether. The white precipitate was collected by filtration and recrystallized from ethanol. It weighed 3.0 g. and melted over the range 221–4° C. with decomposition.

2-dimethylamino-3-methyl-5-nitropyridine, M. 181–91° C., was prepared by the condensation of dimethylamine with 2-chloro-3-methyl-5-nitropyridine in 96% yield.

2-chloro-3-methyl-5-nitropyridine, B. 144–9°/19 mm., was prepared from 2-amino-3-methylpyridine in 46% yield (J. Org. Chem. 14, 328–32 (1949)).

EXAMPLE XIV

2-Dimethylamino-3-Pyridinediazonium Chloride

A solution of 6 g. of 3-amino-2-dimethylaminopyridine hydrochloride in 15 ml. of hydrochloric acid (sp. gr. 1.19) and 15 ml. of water was cooled to 0° C. with stirring. A solution of 8.6 ml. of 5 M sodium nitrite was added slowly to the solution which took on a deep red color. Five ml. of 70% zinc chloride solution were added and the orange-colored product was filtered, washed with a little water, and dried. It weighed 2.1 g., melted at 185–90° C. with decomposition, and probably had the structure:

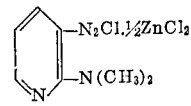

3-amino-2-dimethylaminopyridine hydrochloride, B. 111° C./12 mm., was prepared from 3-amino-2-chloropyridine as outlined by Rudy and Majir (Ber. 71B, 1328 (1938)).

3-amino-2-chloropyridine, M. 75.5–77° C., was prepared from 3-aminopyridine according to Ber. 69B, 2593–2605 (1936).

Certain of the compounds produced in accordance with the above examples were tested by incorporating them together with couplers in a sensitizing solution, coating the solution on a base, exposing the coating to actinic light under a positive original and then developing the exposed coating. These tests are described in the following examples:

EXAMPLE XV

A solution was made up of the following compositions:

| | | |
|---|---|---|
| Acetone | ml | 35 |
| Methanol | ml | 55 |
| 2-methoxyethyl acetate | ml | 10 |
| Sulfosalicylic acid | g | 1.0 |
| Thiourea | g | 0.5 |
| Zinc chloride | g | 0.4 |
| N-o-methoxyphenyl-3-hydroxy-2-naphthamide | g | 2.0 |
| 6-dimethylamino-3-pyridinediazonium chloride:stannic chloride (Ex. I) | g | 1.6 |

This solution was bead-coated on cellulose acetate base. This diazotype material was then exposed under a positive original to actinic light and developed with moist ammonia vapors. A positive diazotype image of purple hue and with a clean white background resulted.

A solution prepared by substituting 2.0 g. of m-hydroxyphenylurea for the N-o-methoxyphenyl-3-hydroxy-2-naphthamide and reducing the amount of 6-dimethylamino - 3 - pyridinediazonium chloride:stannic chloride from 1.6 g. to 1.0 g. was similarly coated on cellulose acetate to give a positive-working diazoztype material. In this case, the image hue was a rich orange-sepia.

EXAMPLE XVI

The following solution was coated on cellulose acetate base:

| | | |
|---|---|---|
| Acetone | ml | 35 |
| Methanol | ml | 55 |
| 2-methoxyethyl acetate | ml | 10 |
| Sulfosalicylic acid | g | 1.0 |
| Thiourea | g | 0.5 |
| Zinc chloride | g | 0.4 |
| m-Hydroxyphenylurea | g | 2.0 |
| 6 - anilino - 3 - pyridinediazonium chloride:zinc chloride (Ex. IX) | g | 1.6 |

The intensely yellow colored product was exposed to actinic light under a positive original. The yellow color bleached where light struck, and the positive image was developed with moist ammonia vapors. The resultant diazotype was orange-yellow on a white background and had good reprint opacity to actinic light.

A diazotype of essentially the same characteristics was prepared by substituting 6-p-toluidino-3-pyridinediazonium chloride:zinc chloride (Ex. VI) for 6-anilino-3-pyridinediazonium chloride:zinc chloride in the above formulation.

EXAMPLE XVII

A solution of the following composition was coated on cellulose acetate film base:

| | |
|---|---|
| Acetone _____ ml__ | 35 |
| Methanol _____ ml__ | 55 |
| 2-methoxyethyl acetate _____ ml__ | 10 |
| Sulfosalicylic acid _____ g__ | 1.0 |
| Thiourea _____ g__ | 1.0 |
| Zinc chloride _____ g__ | 0.5 |
| m-Hydroxyphenylurea _____ g__ | 2.0 |
| 6 - dimethylamino - 5 - methyl - 3 - pyridinediazonium chloride:stannic chloride (Ex. XIII) ___g__ | 1.2 |

The sensitized diazotype material thus produced, pale yellow in color, was exposed to actinic light under a positive original. Treatment with ammonia vapors produced a positive yellow dye image.

This application is a division of application Serial No. 764,242, filed September 30, 1958, and entitled "Aminopyridinediazonium Salts."

Modifications may be resorted to within the scope of the appended claims.

We claim:
1. A light-sensitive diazotype material containing a coupling component and as a light-sensitive diazonium compound an aminopyridinediazonium salt selected from the class consisting of those having the following general formulae:

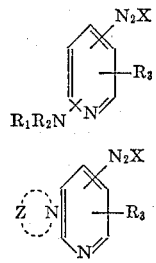

and

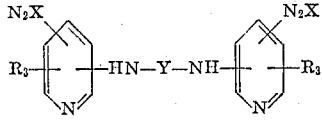

wherein $R_1$ is selected from the class consisting of hydrogen, lower alkyl, aryl of the benzene series, dialkylaminophenyl pyridyl and benzyl; $R_2$ is selected from the class consisting of lower alkyl, aryl of the benzene series, dialkylaminophenyl pyridyl and benzyl; $R_3$ is selected from the group consisting of hydrogen and lower alkyl; Z represents the atoms necessary to complete a hydrogenated 6-membered heterocyclic nucleus; Y is selected from the class consisting of diphenyl and benzylphenyl; and X is selected from the class consisting of an inorganic anion forming the simple aminopyridinediazonium salt and an inorganic anion having attached thereto an inorganic salt selected from the group consisting of zinc chloride; stannic chloride, cadmium chloride, mercuric chloride and boron trifluoride forming the double salt of the aminopyridinediazonium salt and the inorganic salt.

2. A light-sensitive diazotype material containing a coupling component and as a light-sensitive diazonium compound a 6-dimethylamino-3-pyridinediazonium chloride.

3. A light-sensitive diazotype material containing a coupling component and as a light-sensitive diazonium compound a 6-methylamino-3-pyridinediazonium chloride.

4. A light-sensitive diazotype material containing a coupling component and as a light-sensitive diazonium compound a 6-morpholino-3-pyridinediazonium chloride.

5. A light-sensitive diazotype material containing a coupling component and as a light-sensitive diazonium compound a 6-piperazino-3-pyridinediazonium chloride.

6. A light-sensitive diazotype material containing a coupling component and as a light-sensitive diazonium compound a 6-benzylamino-3-pyridinediazonium chloride.

7. A light-sensitive diazotype material containing a coupling component and as a light-sensitive diazonium compound a 6-p-toluidino-3-pyridinediazonium chloride.

8. A light-sensitive diazotype material containing a coupling component and as a light-sensitive diazonium compound a 6-(p-dimethylaminoanilino)-3-pyridinediazonium chloride.

9. A light-sensitive diazotype material containing a coupling component and as a light-sensitive diazonium compound an N,N'-(4,4'-biphenylene)bis(6-amino-3-pyridinediazonium chloride).

10. A light-sensitive diazotype material containing a coupling component and as a light-sensitive diazonium compound a 6-anilino-3-pyridinediazonium chloride.

11. A light-sensitive diazotype material containing a coupling component and as a light-sensitive diazonium compound a 6-(2-pyridylamino) 3-pyridinediazonium chloride.

12. A light-sensitive diazotype material containing a coupling component and as a light-sensitive diazonium compound a 6,6'-(p,p'-methylenedianilino)bis(3-pyridinediazonium chloride).

13. A light-sensitive diazotype material containing a coupling component and as a light-sensitive diazonium compound an N - methyl - 6 - anilino - 3 - pyridinediazonium chloride.

14. A light-sensitive diazotype material containing a coupling component and as a light-sensitive diazonium compound a 6-dimethylamino-5-methyl-3-pyridinediazonium chloride.

15. A light-sensitive diazotype material containing a coupling component and as a light-sensitive diazonium compound a 2-dimethylamino-3-pyridinediazonium chloride.

16. The article as defined in claim 1 wherein the value for X in the aminopyridinediazonium salt is Cl.

References Cited in the file of this patent
UNITED STATES PATENTS

| | | |
|---|---|---|
| 1,752,174 | Hall _____ | Mar. 25, 1930 |
| 1,862,361 | Dohrn et al. _____ | June 7, 1932 |
| 2,298,444 | Weissberger et al. _____ | Oct. 13, 1942 |
| 2,672,418 | Neugebauer et al. _____ | Mar. 13, 1954 |
| 2,971,842 | Moore et al. _____ | Feb. 14, 1961 |
| 2,997,467 | Cox et al. _____ | Aug. 22, 1961 |

OTHER REFERENCES

Saunders: The Aromatic Diazo Compounds, Edward Arnold & Co., London, 1949, page 54.

Venkataraman: Synthetic Dyes, vol. I, Academic Press, N.Y., 1952, pp. 234–235.